United States Patent [19]

Heller et al.

[11] 4,155,347
[45] May 22, 1979

[54] SOLAR RADIATION COLLECTOR

[75] Inventors: Rudolf Heller, Zürich; Pirmin Kühne, Wollerau, both of Switzerland

[73] Assignee: Contraves AG, Zurich, Switzerland

[21] Appl. No.: 880,957

[22] Filed: Feb. 24, 1978

[51] Int. Cl.² .............................................. F24J 3/02
[52] U.S. Cl. ..................................... 126/271; 350/293
[58] Field of Search ............... 126/270, 271; 237/1 A; 350/288, 289, 293, 294, 299

[56] References Cited

U.S. PATENT DOCUMENTS

| | | | |
|---|---|---|---|
| 2,133,649 | 10/1938 | Abbot | 126/271 |
| 3,841,738 | 10/1974 | Caplan | 126/271 |
| 3,847,136 | 11/1974 | Salvail | 126/271 |
| 4,000,734 | 1/1977 | Matlock | 126/271 |
| 4,011,856 | 3/1977 | Gallagher | 126/271 |
| 4,055,161 | 10/1977 | Jones | 126/271 |
| 4,116,221 | 9/1978 | Zaugg | 126/271 |

*Primary Examiner*—James C. Yeung
*Attorney, Agent, or Firm*—Werner W. Kleeman

[57] ABSTRACT

A solar radiation collector for generating useful heat in a liquid, comprising an essentially horizontal liquid infeed line and a liquid outfeed line. A heating device for heating the liquid incorporates radiation absorbing, mutually spaced tubes interconnecting the infeed line with the outfeed line, the lengthwise axes of the tubes each coinciding with a focusing axis of an associated mirror or reflector, all of the mirrors being rotatable about their focusing axis in order to focus the incident solar radiation upon the associated tube. The heating device is mounted as a unit in a completely closed hollow compartment. The infeed and outfeed lines are embedded as supporting reinforcement means in the longitudinal walls of the hollow compartment, and these longitudinal walls in conjunction with the transverse walls interconnecting such longitudinal walls form a self-supporting frame construction for the front window and the rear closure wall of the hollow compartment which contains the heating device.

5 Claims, 3 Drawing Figures

SOLAR RADIATION COLLECTOR

BACKGROUND OF THE INVENTION

The present invention relates to a new and improved construction of a solar radiation collector for generating useful heat in a fluid medium, in particular a liquid.

Generally speaking, the solar radiation collector—also referred to in the art as a solar collector—of the present invention is of the type comprising a substantially horizontal infeed or inflow line for the liquid which cooperates with an outfeed or outflow line for the heated liquid, the outfeed line being located essentially parallel to the infeed line and at a higher elevation relative thereto. A heating device serves to heat the incoming liquid and incorporates mutually spaced, radiation absorbing tubes or pipes which interconnect the infeed and outfeed lines or conduits. The tubes each have a lengthwise extending axis which coincides with the focusing axis of an associated mirror or reflector which may be in the form of a substantially parabolic cylindrical mirror. All of these mirrors or reflectors are rotatably driven about their focusing axis, so as to be able to focus at any time the incident solar radiation upon the associated tube and to thus convey the heated liquid in the form of a convection flow into the outfeed line. The heating device is mounted as a unit within a hollow compartment which is closed at all sides. The hollow compartment has a front wall structured as a window for the extensively uninterrupted through-passage of the solar radiation, and its longitudinal and transverse walls as well as its rear closure wall are formed of thermally insulating material.

Equipment of this type is generally known, for instance from a combination of the French patent application No. 2,269,038, the German patent publication No. 231,294 and U.S. Pat. No. 2,907,318. Yet, manufacture of such equipment is however not optimally economical, since such equipment construction does not fully exploit the possibility of optimally utilizing plastics and/or foam plastics. In particular, the liquid lines or conduits and the thermally insulating walls, are designed and installed independently of one another.

SUMMARY OF THE INVENTION

Hence, with the foregoing in mind, it is a primary object of the present invention to provide an improved solar radiation collector which is not associated with the aforementioned drawbacks and limitations of the prior art proposals.

Another and more specific object of the present invention aims at the provision of improved prerequisites for the fabrication and employment of such equipment, particularly by virtue of the fact that the liquid lines or conduits coact with the insulation walls in a manner so as to ensure in an economical fashion the requisite strength and rigidity of the equipment.

A further significant object of the present invention aims at providing a new and improved construction of solar collector which is relatively simple in design, extremely reliable in operation, economical to manufacture, and requires a minimum of maintenance and servicing.

Now in order to implement these and still further objects of the invention, which will become more readily apparent as the description proceeds, the solar radiation collector of the present development is manifested by the features that the infeed and outfeed lines or conduits are embedded as supporting reinforcements or reinforcement means in the longitudinal walls of the hollow compartment. These longitudinal walls in conjunction with the transverse walls which interconnect such longitudinal walls form a self-supporting frame structure or construction for the front side window and the rear side closure wall of the hollow compartment containing the heating device.

It is preferable to blacken at least part of the inner surface of the walls of the hollow compartment, so as to increase the internal temperature of the hollow compartment due to absorption of the scattered radiation, and to thereby provide good prerequisites for improving the efficiency of the equipment.

According to a further embodiment of the invention the rear closure wall of the hollow compartment can consist of at least partially light pervious material, so that during the day there is afforded a certain illumination of a room or area covered by the inventive solar radiation collectors.

A particularly advantageous construction of the inventive solar radiation collectors is realised if there is employed as the thermally insulating material for the walls of the hollow compartment so-called light construction materials, typically for instance conventional foam plastics, since such materials possess only a low inherent strength and rigidity and thus can be reinforced in a beneficial and sensible manner by the liquid lines or conduits.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
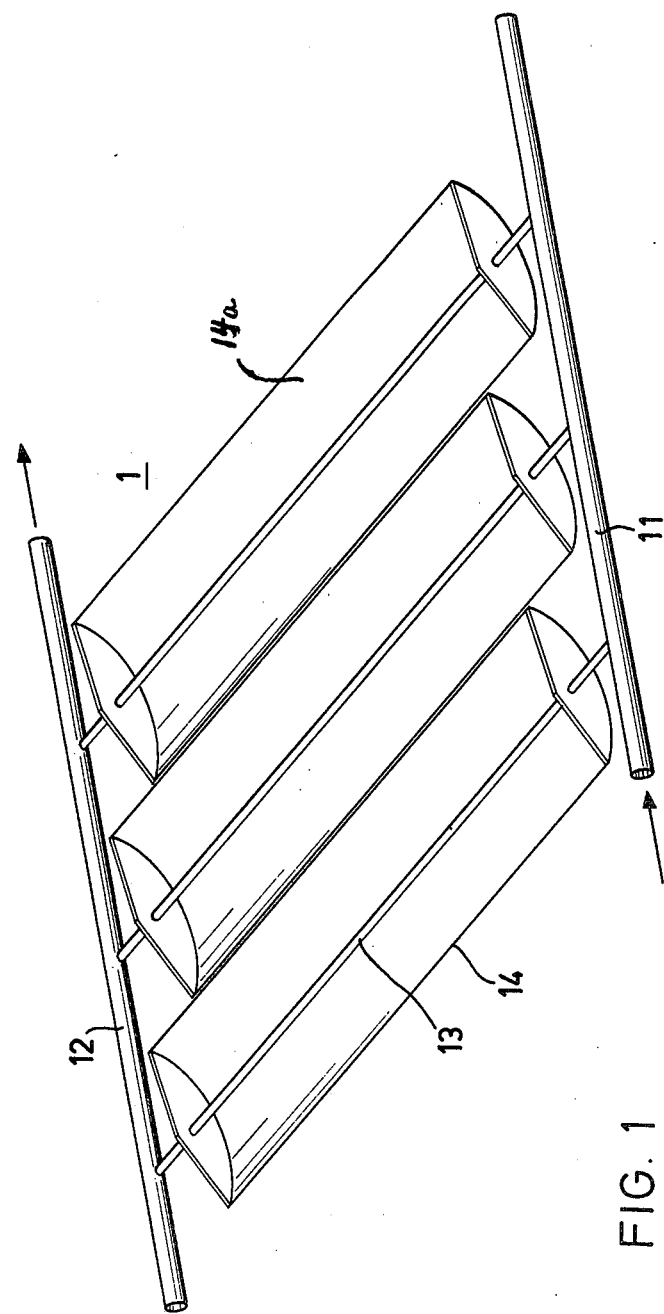
FIG. 1 is a schematic perspective view of a basically conventional heating device with associated liquid infeed and outfeed lines as well as heating tubes and the therewith coacting mirrors or reflectors for heating the liquid flowing through the tubes.

Describing now the drawings, in FIG. 1 there is schematically shown in perspective view the basically known main components of a solar radiation collector employing a heating device 1. This solar collector will be seen to comprise at a lower level a substantially horizontal water infeed or inflow line or conduit 11 and essentially parallel thereto at a higher level an outfeed or outflow line or conduit 12 for the heated water. Extending transversely with respect to the infeed line 11 and the outfeed line 12 are mutually spaced, radiation absorbing tubes or pipes 13 which are located in a plane.

The lengthwise axes of these tubes 13 coincide with the related focusing axis of an associated mirror or reflector 14 which advantageously is of substantially parabolic cylindrical configuration. These mirrors 14, as is known in this field of technology, can be rotated or moved so as to follow the momentary position of the sun, so that in the presence of sunlight each tube 13 is impinged by the focused sunlight which falls upon the associated mirror or reflector surface 14a. As a result, the liquid flowing through the tubes or pipes 13 is heated and is conveyed as an ascending convection flow into the outfeed line 12.

Figure 2:
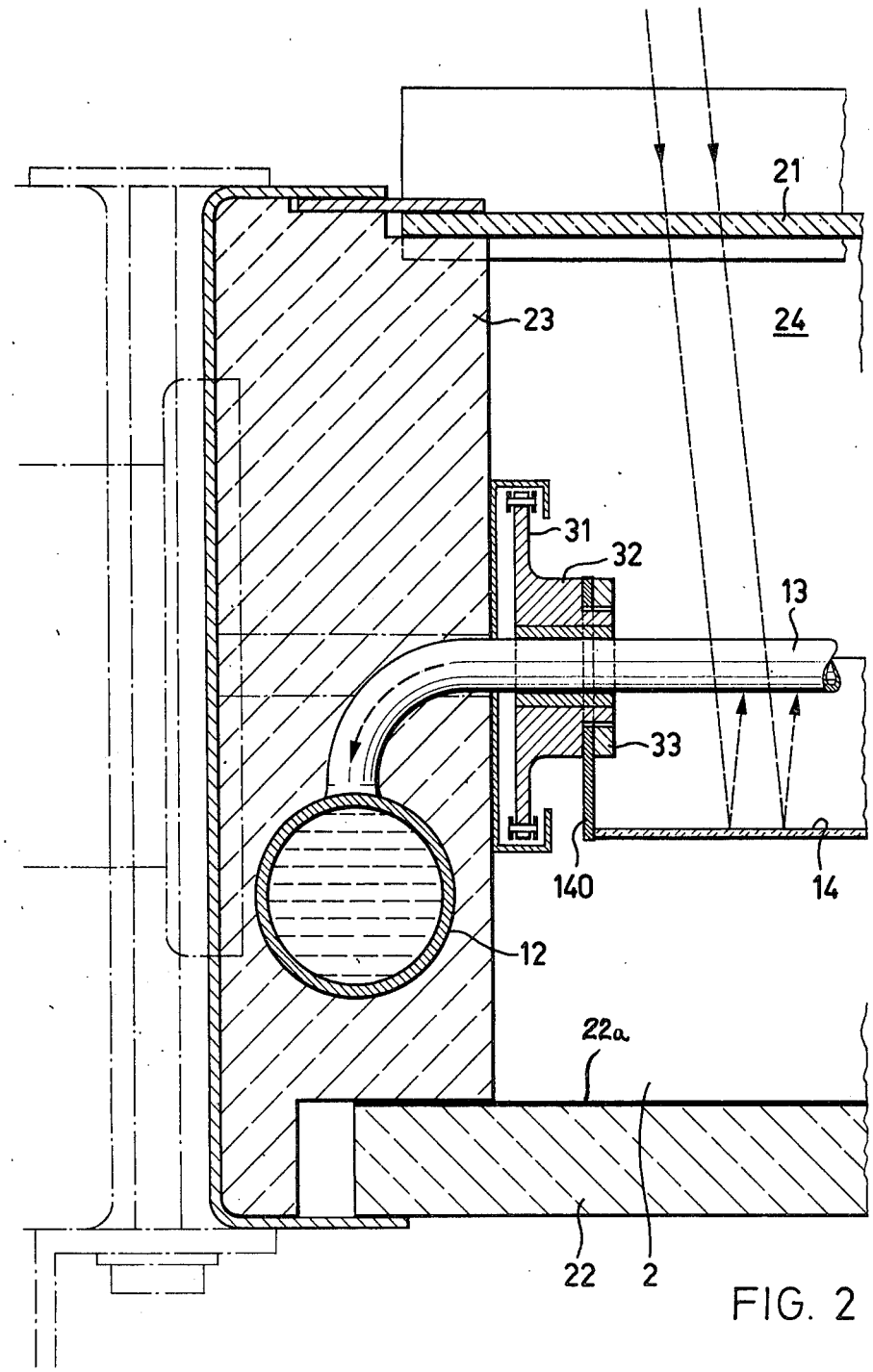
FIG. 2 is a cross-sectional view through one of the longitudinal walls of the hollow compartment which is reinforced by the outfeed line or conduit, further showing the adjoining front and rear wall parts, and in longitudinal section one of the tubes or pipes and the associated mirror or reflector, and further illustrating in a simplified manner the rotatable drive means for such mirror.

Now in FIG. 2 there is shown in side sectional view a solar radiation collector as constructed in accordance with the teachings of the present invention and depicts one of the tubes 13 with its associated mirror or reflector 14 mounted in a closed, for instance quadratic-shaped hollow compartment 2. There is also shown in cross-section the outfeed or outflow line 12 which is mounted in the depicted longitudinal wall 23. At the other oppositely situated longitudinal wall which is not visible in the showing of FIG. 2, there is mounted the infeed line 11. Equally, it is to be appreciated that a plurality of such mirrors 14 and associated tubes 13, like in the arrangement of FIG. 1, are installed in spaced relationship along the length of the hollow compartment 2. At the side of the hollow compartment 2 which faces towards the sun, there is provided as the front wall a glass window 21 which, if desired, also can be a double-glass window to improve the insulation, and the rear wall 22 of such hollow compartment 2 consists of a thermally insulating rigid foam plate or the like the inner surface of which is blackened, as generally indicated in FIG. 2 by reference character 22a. As also will be explained more fully hereinafter, the rear wall 22 also could be formed of transparent or light pervious material.

Serving as the support structure for the front side window 21 and the rear side closure wall 22 is a self-supporting frame construction composed of the two longitudinal or lengthwise extending walls 23 and two transverse or end walls 24 which interconnect the longitudinal walls 23. The longitudinal walls 23 and the transverse walls 24 can be formed of, for instance, any suitable heat insulating rigid foam material. Advantageously, and as previously mentioned, the infeed line 11 and the outfeed line 12 are embedded as supporting reinforcements in the longitudinal walls 23. This has been shown in FIG. 2 for the outfeed line 12 of the visible longitudinal wall 23, but as also explained previously at the oppositely situated non-visible longitudinal wall 23 there is embedded the infeed line or conduit 11, as generally indicated also in FIG. 3.

Continuing, FIG. 2 further illustrates an exemplary form of drive means for the mirrors or reflectors 14 and there will be seen that at each tube or pipe 13 there is rotatably mounted a sprocket wheel or gear 31 by means of a hub support or bearing 32. Between this hub or hub support 32 and an end wall 140 of the related mirror 14, there is provided a suitable drive connection 33, so that by means of the sprocket gear 31 of each related mirror 14 and which sprocket gears are operatively connected by a driving sprocket chain 310 (FIG.3) with a not particularly illustrated but conventional positioning or adjustment motor or other suitable drive motor, it is possible to selectively adjust the position of each mirror 14 in accordance with the position of the migrating sun.

Figure 3:
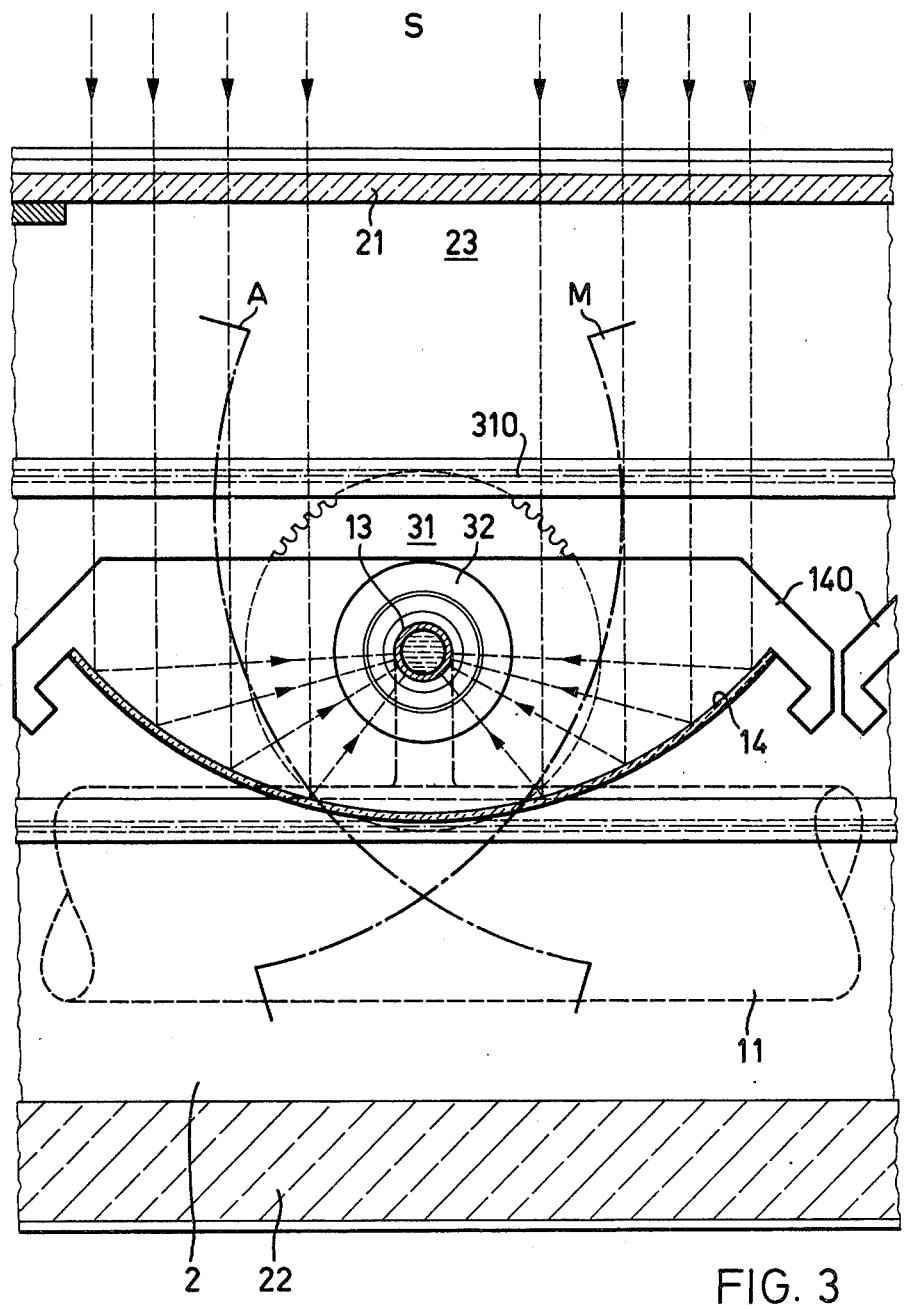
FIG. 3 is a fragmentary cross-sectional view through one of the tubes, the corresponding parts of the front and the rear walls and an end view of an associated mirror, and also partially in section the drive mechanism or drive means for such mirror.

Now in FIG. 3 there is shown in cross-sectional view one of the tubes 13 with its associated mirror or reflector 14, and the end wall 140 thereof is shown in front view. Equally shown in front view is its associated sprocket gear or wheel 31 and the drive chain 310 as well as the associated hub 32. There is also indicated the manner in which during the course of a day the depicted mirror 14 is rocked out of the phantom line morning position M through the full line noonday position into the evening position A, and further, the manner in which the rays S of the sun are focused by the mirror 14 onto the related or coacting tube 13.

As previously mentioned the rear wall 22 also can be formed of any suitable transparent material, in order to illuminate by means of the scattered light during the day a room or area located below the solar collector. As the light pervious and thermally insulating material there can be employed practically all light pervious plastics, typically for instance acrylic glass or also so-called clear polyvinylchloride.

The depicted solar radiation collectors can be constructed as easy to handle, portable roof elements for buildings or other structures and having a total height which is less than about 25–30 centimeters. It is only necessary to periodically clean the outer surface of the front window 21.

By appropriately selecting the degree of blackening of the inner walls of the hollow compartment 2 and by determining the proportion of scattered light, it is possible to extensively determine optimum efficiency for a given condition.

While there are shown and described present preferred embodiments of the invention, it is to be distinctly understood that the invention is not limited theretob, but may be otherwise variously embodied and practiced within the scope of the following claims.

Accordingly, what we claim is:

1. A solar radiation collector for producing useful heat in a liquid, comprising:
   a substantially horizontal infeed line for a liquid to be heated;
   an outfeed line for the heated liquid extending essentially parallel to the liquid infeed line;
   said liquid outfeed line being located at a higher elevational position than the elevational position of said liquid infeed line;
   a heating device for heating the liquid;
   said heating device comprising mutually spaced, radiation absorbing tubes which interconnect for flow communicating the liquid infeed line with the liquid outfeed line;
   each of said tubes having a lengthwise extending axis;
   a respective mirror coacting with each said tube;
   each mirror having a focusing axis;
   the lengthwise extending axis of each tube essentially coinciding with the focusing axis of the related mirror;
   drive means for rotating said mirrors about their respective focusing axis, in order to focus the incident solar radiation upon the related tube and to convey the thus heated liquid in the form of a convection flow into the outfeed line;
   means defining a hollow compartment closed at all sides in which there is mounted as a unit said heating device;
   said hollow compartment comprising a front wall in the form of a window for the extensive uninterrupted throughpassage of the solar radiation;

said hollow compartment further including a pair of spaced longitudinal walls and transverse walls interconnecting said longitudinal walls and a rear closure wall;

said longitudinal walls, transverse walls, and rear closure wall being formed of thermally insulating material;

said infeed and outfeed lines being embedded as supporting reinforcement means in said longitudinal walls;

said longitudinal walls in conjunction with the therewith interconnecting transverse walls forming a self-supporting frame construction for the window and the rear closure wall.

2. The solar radiation collector as defined in claim 1, wherein:

each of said mirrors possesses a substantially parabolic cylindrical configuration.

3. The solar radiation collector as defined in claim 1, wherein:

at least part of the inner surface of the walls of the hollow compartment is blackened.

4. The solar radiation collector as defined in claim 1, wherein:

said rear closure wall of the hollow compartment is composed of at least partially light pervious material.

5. A solar radiation collector for producing useful heat in a liquid, comprising:

an infeed line for a liquid to be heated;

an outfeed line for the heated liquid;

a heating device for heating the liquid;

said heating device comprising mutually spaced, radiation absorbing tubes which interconnect for flow communicating the liquid infeed line with the liquid outfeed line;

a respective mirror coacting with each said tube;

drive means for rotating said mirrors in order to focus the incident solar radiation upon the related tube;

means defining a hollow compartment closed at all sides in which there is mounted as a unit said heating device;

said hollow compartment comprising a front wall in the form of a window for the extensive uninterrupted throughpassage of the solar radiation;

said hollow compartment further including a pair of spaced longitudinal walls and transverse walls interconnecting said longitudinal walls and a rear closure wall;

said infeed and outfeed lines being embedded as supporting reinforcement means in said longitudinal walls;

said longitudinal walls in conjunction with the interconnecting transverse walls forming a self-supporting frame construction for the window and the rear closure wall.

* * * * *

UNITED STATES PATENT AND TRADEMARK OFFICE
CERTIFICATE OF CORRECTION

PATENT NO. : 4,155,347
DATED : May 22, 1979
INVENTOR(S) : RUDOLF HELLER and PIRMIN KÜHNE It is certified that error appears in the above-identified patent and that said Letters Patent are hereby corrected as shown below:

On the title page, after item [22], insert the following:

[30]     Foreign Application Priority Data
    March 2, 1977  [CH]  Switzerland ........2605/77

Signed and Sealed this

First Day of July 1980

[SEAL]

Attest:

SIDNEY A. DIAMOND

*Attesting Officer*     *Commissioner of Patents and Trademarks*